A. W. SOUTHALL.
ELECTRIC WELDING MACHINE.
APPLICATION FILED JULY 26, 1918.

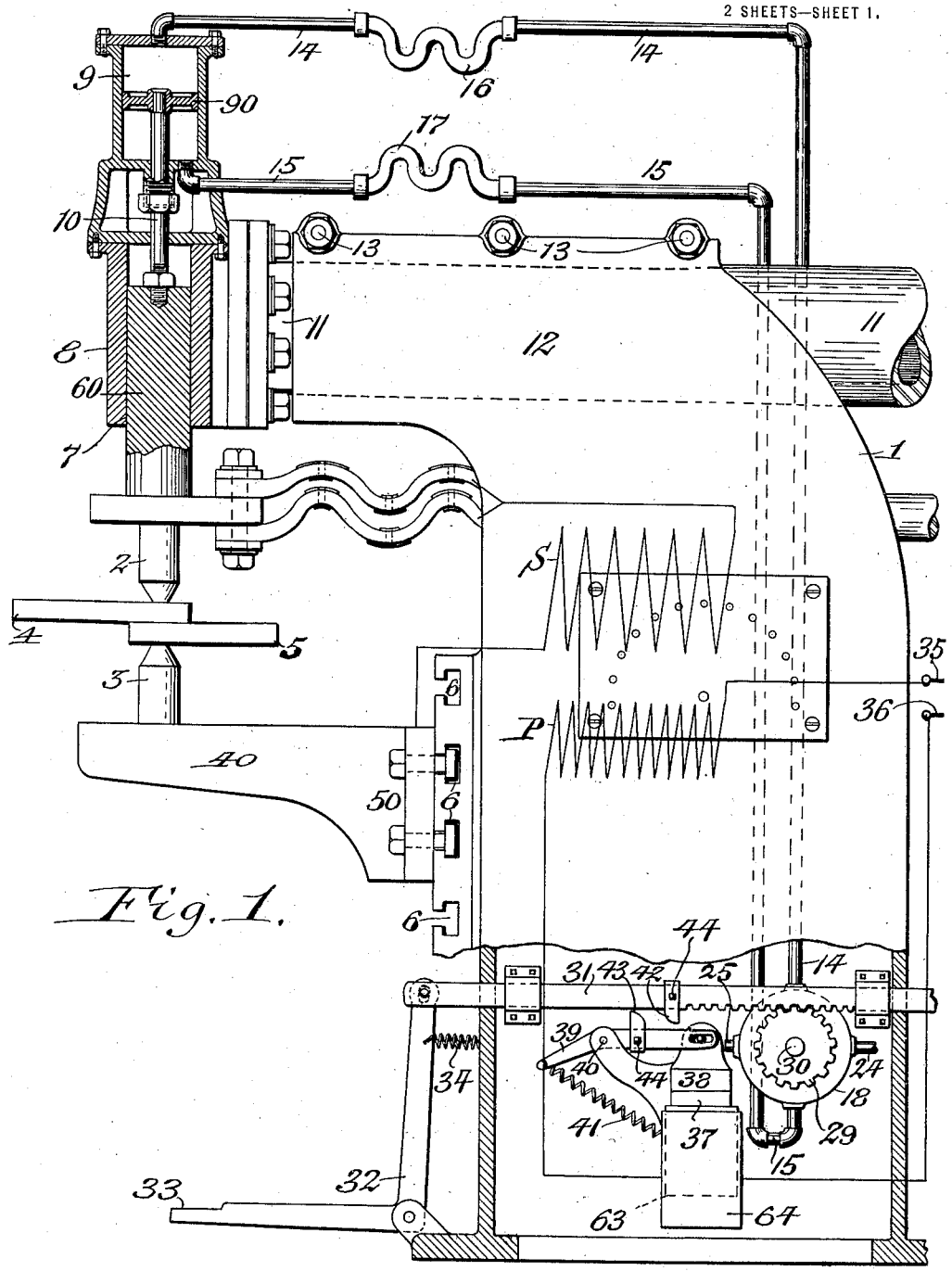

1,315,876.

Patented Sept. 9, 1919.
2 SHEETS—SHEET 2.

Inventor
Albert W. Southall
by Geyer & Topp
Attorneys

UNITED STATES PATENT OFFICE.

ALBERT W. SOUTHALL, OF BUFFALO, NEW YORK.

ELECTRIC-WELDING MACHINE.

1,315,876.  Specification of Letters Patent.  Patented Sept. 9, 1919.

Application filed July 26, 1918. Serial No. 246,609.

*To all whom it may concern:*

Be it known that I, ALBERT W. SOUTHALL, a citizen of the United States, residing in Buffalo, in the county of Erie and State of New York, have invented new and useful Improvements in Electric-Welding Machines, of which the following is a specification.

This invention relates to an electric welding machine and has for its object the production of a machine of this character which permits electric welding operations to be effected more rapidly, thoroughly and easily than has been heretofore possible and in a manner which will permit of obtaining better results for the amount of current consumed and also increase the output of the machine by permitting the operator to employ both hands for manipulating the work pieces which are to be connected.

Figure 3:
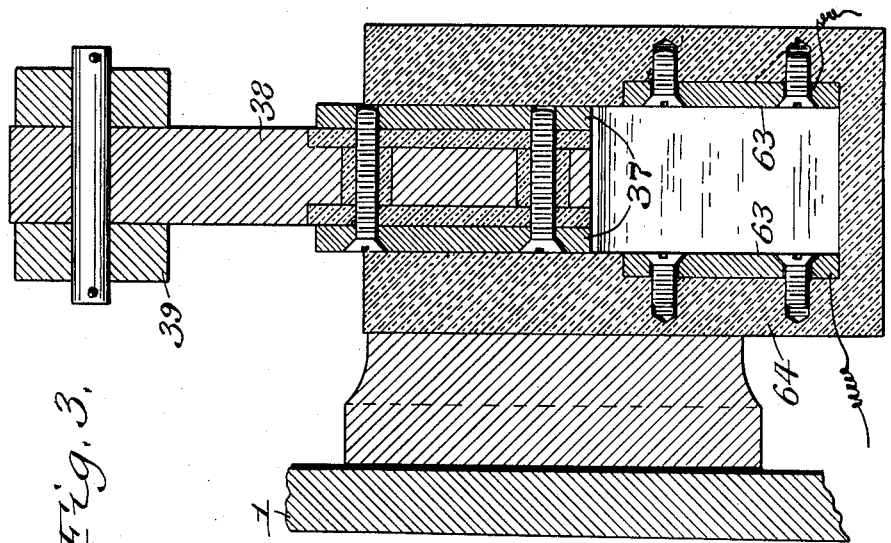
Figure 2:
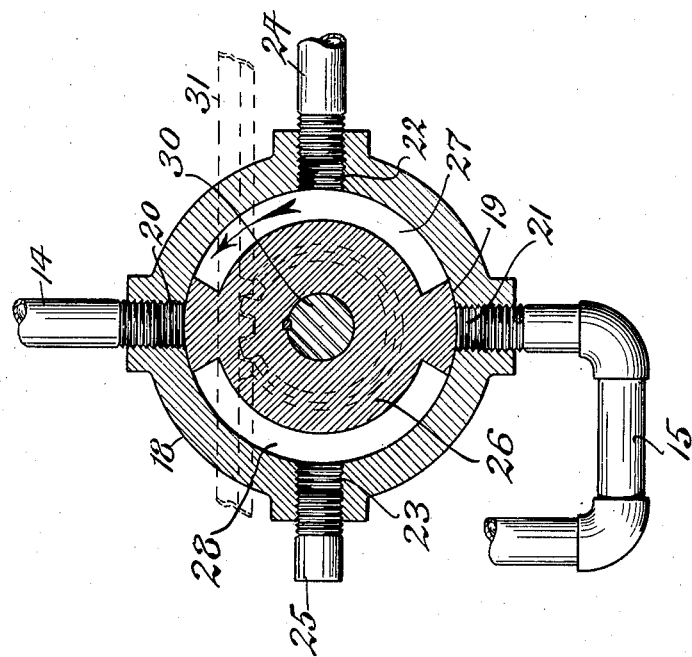

In the accompanying drawings:

Figure 1 is a side elevation, partly in section, of an electric welding machine embodying my improvements. Fig. 2 is a sectional view, on an enlarged scale, of the valve which controls the supply of the pressure medium to and the exhaust from the means which actuate the movable electrode. Fig. 3 is a vertical section showing one form of switch suitable for controlling the current for the welding operation.

Similar characters of reference refer to like parts throughout the several views.

1 represents the main frame of the machine which may be of any suitable construction to support the several working parts of the machine. In front of this frame are arranged two electrodes 2, 3 one above the other between which the work pieces 4, 5 are adapted to be clamped and electrically welded. One of these electrodes is preferably stationary and the other is normally movable toward and from the fixed electrode. In the present instance the lower electrode 3 is normally fixed but adjustably supported on the main frame by means of a bracket 40 which carries this fixed electrode and is adjustably connected with the frame by means of bolts 50 arranged on the bracket and adapted to engage with one or another pair of grooves 6 on the lower front part of the main frame, as shown in Fig. 1. The upper electrode 2 may be moved toward and from the lower electrode by any suitable means but preferably by the pressure fluid actuating means shown in the drawings, and which comprises a vertically movable plunger 60 guided in a vertical way 7 in a supporting head 8, a power cylinder 9 mounted on the upper end of the supporting head, and a piston 90 arranged in the power cylinder and connected by means of an upright piston rod 10 with the plunger. Upon admitting a pressure medium such as compressed air alternately into opposite ends of the cylinder and exhausting the spent pressure medium alternately from the same the piston therein is caused to rise and fall and thereby move the upper electrode away from and toward the lower fixed electrode and either releasing or clamping the work pieces to be electrically welded.

In order to permit of welding together pieces of different dimensions the head 8 which supports the upper electrode is made adjustable horizontally in a direction lengthwise of the frame and the lower electrode is adjustable horizontally lengthwise on its bracket, or brackets of different lengths may be employed to suit the distance at which it is necessary to locate the lower electrode from the lower front part of the frame in order to permit of welding together pieces of different dimensions. The adjustment of the upper electrode toward and from the frame is preferably effected by providing the supporting head with a horizontal longitudinal shank 11 which is arranged in a split socket 12 in the upper part of this frame and providing clamping bolts 13 which connect the socket on opposite sides of its split. By loosening the bolts 13 the grip of the socket on the shank is released so that the latter together with the movable electrode and associated parts can be moved forward and backward to suit the dimensions of the pieces which are to be electrically welded after which tightening of these bolts holds these parts in this position.

14, 15 represent two distributing pipes through which a pressure medium is alternately admitted into opposite ends of the power cylinder and exhausted therefrom, these pipes being provided with flexible sections 16, 17 so as to permit of moving the power cylinder together with the movable electrode and connecting parts lengthwise of the machine without disturbing those parts of these pipes which are connected with the valve whereby the supply of pressure medium thereto and the exhaust therefrom is controlled. This valve may be of any suitable construction but as shown in the drawings the same preferably comprises a valve casing 18 having a circular valve seat 19 on its interior, two distributing ports 20, 21 arranged on diametrically opposite sides thereof and connected respectively with the distributing pipes 14, 15 leading to the upper and lower ends of the power cylinder, and a pressure supply port 22 and an exhaust port 23 arranged on diametrically opposite sides of this casing at right angles to the distributing ports, the supply port being connected with a pipe 24 through which a pressure medium such as compressed air is supplied and the exhaust port being connected to a pipe 25 leading to the atmosphere, and a rotary valve plug 26 engaging with the seat of the valve casing and provided in its periphery with two port cavities 27, 28 the cavity 27 operating to connect the supply port alternately with the distributing ports and the cavity 28 operating to connect the exhaust port alternately with the distributing ports.

In the position of the parts shown in Fig. 2 the supply port and the exhaust port are both cut off from the distributing ports. Upon turning the valve plug in the direction of the arrow in Fig. 2 the supply port will be connected with the distributing port 20 leading to the upper end of the power cylinder thereby causing the movable electrode to be depressed and the work pieces to be clamped against the lower electrode, at the same time the exhaust port is connected with the distributing port 21 communicating with the lower end of the power cylinder so as to permit the escape from the latter of the spent pressure medium which was previously therein. Upon moving the valve plug in a direction opposite to that indicated by the arrow in Fig. 2 the live pressure medium will be conducted into the lower end of the power cylinder and raise the movable electrode while the spent pressure medium will be permitted to escape from the upper end of the power cylinder.

The operation of the valve plug may be effected by various means for instance by those which are shown in the drawings and which comprises a gear pinion 29 connected with the spindle 30 of the rotary valve, a horizontally and lengthwise reciprocable gear rack 31 guided on the lower part of the main frame and having its teeth meshing with the upper side of the gear pinion, an L-shaped foot lever 32 pivoted at its elbow on the lower part of the main frame and having its horizontal lower arm provided with a treadle 33 and its upper arm connected with the front end of the gear rack, a spring 34 operating to move the foot lever and gear rack backwardly and preferably connected at its opposite ends with the upper arm of the foot lever and the adjacent part of the main frame, as shown in Fig. 1.

In the normal position of the foot lever the same is moved backwardly to its extreme rearward position so that the pressure medium is admitted to the lower end of the power cylinder and the upper end of the latter is connected with the atmosphere leaving the space between the electrodes clear for either removing the finished work piece or inserting therebetween work pieces which are to be welded, while upon moving the foot lever forwardly, and downwardly the valve plug will be so operated that the pressure fluid is admitted to the upper end of the power cylinder for clamping the work piece between the upper and lower electrodes, while the spent pressure medium is exhausted from the lower end of the power cylinder.

The means causing the electric current to pass from one electrode to another and weld together the work pieces clamped between the same may be variously organized and the same are therefore only represented diagrammatically in the drawings. As there shown the electrodes are connected to the opposite ends of the secondary S of a step-down transformer, the primary P of the same having one end connected with one feed wire 35 of the source of electric supply while the connection between the other end of this primary and the opposite feed wire 36 of the electric supply contains an electric switch whereby the current may be established or interrupted. Although this switch may be constructed in a variety of ways that shown in the drawings, as an example of one suitable for this purpose, comprises two fixed switch contacts 63, 63 connected with the primary electric circuit and mounted on the adjacent part of the main frame and a movable contact 37 adapted to move into and out of engagement with the fixed contacts and make or break the electric circuit. This movable contact is mounted on a vertically movable slide 38 and the latter is adapted to be operated by means of a switch lever 39 pivoted between its arms to a suitable fixed part by means of a pin 40 and having its rear arm connected with the slide 38, a spring 41 connecting the front arm of the switch lever with an adjacent stationary part and adapted to shift the latter in a direction for raising the slide 38 and opening the electric switch, and a cam shaped tappet 42 arranged on the gear rack and adapted during its forward movement to engage with a cam shaped tappet 43 on the rear arm of the switch lever for depressing the latter and moving this slide downwardly so as to close the electric switch. In order to prevent sparking between the contacts 63 and 37 the same are engaged and disengaged in oil this being accomplished for example, by mounting the contacts on the inner side of a pot 64 of insulating material and filled to a suitable height with oil, as shown in Fig. 3.

During the initial part of the forward movement of the gear rack under the pressure of the foot against the treadle the pressure medium is caused to move the upper electrode downwardly toward the fixed electrode and clamp the work pieces between the same and immediately thereafter the tappet of the gear rack engages with the tappet of the switch lever and causes the switch slide to be depressed so that the switch is closed and an electric current is passed through the electrode and the work pieces between the same. Upon releasing the foot pressure on the treadle the first part of the backward movement of the gear rack causes the electric switch to open for cutting off the current and during the last part of the backward movement of the gear rack the pressure on the work pieces is removed and the upper electrode is raised so as to release the finished work. In order to permit of adjusting the tappets on their respective supports to suit the thickness of the work pieces which are being operated upon or to meet other conditions each of these tappets is preferably mounted adjustably on its respective support by providing the same with an opening which receives this support and clamping screw 44 mounted on each tappet and engaging the adjacent part of its support.

By means of these improvements the work pieces may be freely manipulated by employing both hands of the operator, this being possible owing to the fact that both the pressure medium valve and the electric switch are controlled by foot power, thereby enabling the welding operation to be effected expeditiously and economically and with a minimum consumption of current.

Furthermore by means of this apparatus electric welding operations may be easily effected by depressing the foot lever at short intervals, thereby causing a succession of heating periods of comparatively short duration to be applied to the work piece which operates to effectively weld the same together without unduly melting these parts or distorting the same.

I claim as my invention:

1. An electric welding apparatus comprising a normally fixed electrode, a normally movable electrode adapted to coöperate with the fixed electrode, a piston connected with the movable electrode, a cylinder containing said piston, and means for supplying a pressure medium to and exhausting the same from opposite ends of said cylinder alternately comprising a valve case having a circular seat, two distributing ports arranged on diametrically opposite sides of the casing and communicating respectively with opposite ends of said cylinder and pressure medium supply and exhaust ports arranged on diametrically opposite sides of said casing at right angles to said distributing ports, a rotary valve plug engaging with the seat of said casing and having distributing and exhaust cavities for placing either of said distributing ports in communication with said supply port or said exhaust port, a gear pinion connected with said valve plug, and a gear rack meshing with said gear pinion.

2. An electric welding apparatus comprising a normally fixed electrode, a normally movable electrode adapted to coöperate with the fixed electrode, a piston connected with the movable electrode, a a cylinder containing said piston, and means for supplying a pressure medium to and exhausting the same from opposite ends of said cylinder alternately comprising a valve casing having a circular seat, two distributing ports arranged on diametrically opposite sides of the casing and communicating respectively with opposite ends of said cylinder and pressure medium supply and exhaust ports arranged in diametrically opposite sides of said casing at right angles to said distributing ports, a rotary valve plug engaging with the seat of said casing and having distributing and exhaust cavities for placing either of said distributing ports in communication with said supply port, or said exhaust port, a gear pinion connected with said valve plug, a gear rack meshing with said gear pinion, a treadle connected with said gear rack for moving the same forwardly and a spring operating to move said gear rack and associated parts backwardly.

3. An electric welding machine comprising two coöperating electrodes one of which is normally fixed and the other normally movable toward and from the fixed electrode, fluid pressure operated means for actuating said movable electrode, a switch for controlling the circuit of said electrodes, and a treadle operatively associated with said fluid pressure means and said switch.

4. An electric welding apparatus comprising a normally fixed electrode, a normally movable electrode adapted to coöperate with the fixed electrode, a piston connected with the movable electrode, a cylinder containing said piston, a valve for controlling the supply of pressure medium to opposite ends of the cylinder and the exhaust therefrom having a rotary plug, a gear pinion connected with said plug, a reciprocating gear rack meshing with said pinion, a switch for controlling the current for said electrodes and having a movable member, and means for transmitting the movement of said rack to said movable switch member.

5. An electric welding apparatus comprising a normally fixed electrode, a normally movable electrode adapted to coöperate with the fixed electrode, a piston connected with the movable electrode, a cylinder containing said piston, a valve for controlling the supply of pressure medium to opposite ends of the cylinder and the exhaust therefrom having a rotary plug, a gear pinion connected with said plug, a reciprocating gear rack meshing with said pinion, a switch for controlling the current for said electrodes, and having a movable member, and means for transmitting the movement of said rack to said movable switch member comprising a switch lever connected with said switch member, a spring connected with said lever and operating to move the same in the direction for opening said switch, a cam shaped tappet arranged on said gear rack, and a cam shaped tappet arranged on said switch lever and adapted to be engaged by said tappet on the rack for closing the switch.

ALBERT W. SOUTHALL.